US008959874B2

(12) United States Patent
Wasterval

(10) Patent No.: US 8,959,874 B2
(45) Date of Patent: Feb. 24, 2015

(54) PORTABLE DRILLING RIG APPARATUS AND ASSEMBLY METHOD

(71) Applicant: Philip Wasterval, Edwards, CO (US)

(72) Inventor: Philip Wasterval, Edwards, CO (US)

(73) Assignee: International Drilling Equipment Company, LLC, Spring, TX (US)

( * ) Notice: Subject to any disclaimer, the term of this patent is extended or adjusted under 35 U.S.C. 154(b) by 0 days.

(21) Appl. No.: 13/899,293

(22) Filed: May 21, 2013

(65) Prior Publication Data

US 2013/0318909 A1 Dec. 5, 2013

Related U.S. Application Data

(62) Division of application No. 12/568,489, filed on Sep. 28, 2009.

(51) Int. Cl.
*E21B 7/02* (2006.01)

(52) U.S. Cl.
CPC .................. *E21B 7/023* (2013.01); *E21B 7/021* (2013.01)
USPC .............. 52/745.18; 52/117; 52/118; 52/119; 52/146; 52/651.05

(58) Field of Classification Search
USPC ......... 52/116–119, 146, 632, 651.01, 651.05, 52/651.07, 745.19, 745.2, 745.17, 745.18; 173/28, 42, 44, 190, 193; 166/379; 175/162, 203
See application file for complete search history.

(56) References Cited

U.S. PATENT DOCUMENTS

| 867,536 | A | * | 10/1907 | Rochford | 175/89 |
| 2,268,796 | A | | 1/1942 | Brauer | |
| 2,565,777 | A | | 8/1951 | Moon | |
| 2,594,847 | A | * | 4/1952 | Bates et al. | 173/37 |
| 2,689,549 | A | * | 9/1954 | Hayman | 91/169 |
| 2,829,741 | A | | 4/1958 | Selberg et al. | |
| 2,852,111 | A | | 9/1958 | Fuller et al. | |
| 2,857,993 | A | * | 10/1958 | Terrell | 52/120 |
| 2,920,725 | A | | 1/1960 | Emmons | |
| 2,993,570 | A | * | 7/1961 | Bender | 52/118 |
| 3,016,992 | A | * | 1/1962 | Wilson | 52/115 |
| 3,071,213 | A | * | 1/1963 | Bender | 52/117 |
| 3,181,658 | A | * | 5/1965 | Bender | 52/116 |
| 3,228,151 | A | * | 1/1966 | Woolslayer et al. | 52/64 |
| 3,262,237 | A | * | 7/1966 | Jenkins et al. | 52/116 |
| 3,271,915 | A | * | 9/1966 | Woolslayer et al. | 52/120 |
| 3,295,270 | A | * | 1/1967 | Woolslayer et al. | 52/117 |

(Continued)

FOREIGN PATENT DOCUMENTS

JP 06235263 A * 8/1994 ............ E04G 21/16

OTHER PUBLICATIONS

Office Action issued in related U.S. Appl. No. 12/568,489 mailed Jul. 29, 2014 (13 pages).

*Primary Examiner* — Robert Canfield
*Assistant Examiner* — Charissa Ahmad
(74) *Attorney, Agent, or Firm* — Osha Liang LLP

(57) ABSTRACT

A portable drilling rig apparatus includes a rig floor having a pedestal structure thereon, the pedestal structure comprising a lower pivot point and a lower attachment point and wherein the pedestal structure is configured to be rotated to a vertical position about the lower pivot point. The drilling rig further includes a mast structure having a mast pivot point at a lower end of the mast structure wherein the mast pivot point is configured to be pinned to an upper pivot point of the pedestal structure.

10 Claims, 11 Drawing Sheets

(56) References Cited

U.S. PATENT DOCUMENTS

| | | | | |
|---|---|---|---|---|
| 3,403,485 A * | 10/1968 | Cernosek | | 52/121 |
| 3,483,933 A * | 12/1969 | Dyer et al. | | 173/39 |
| 3,719,238 A * | 3/1973 | Campbell et al. | | 173/147 |
| 3,747,695 A * | 7/1973 | Branham | | 173/151 |
| 3,803,780 A * | 4/1974 | Donnally | | 52/116 |
| 3,807,109 A * | 4/1974 | Jenkins et al. | | 52/120 |
| 3,817,397 A | 6/1974 | Wellman | | |
| 3,922,825 A * | 12/1975 | Eddy et al. | | 52/116 |
| 3,942,593 A * | 3/1976 | Reeve et al. | | 173/186 |
| 4,024,924 A * | 5/1977 | Houck | | 173/151 |
| 4,078,617 A * | 3/1978 | Cherrington | | 173/1 |
| 4,135,340 A * | 1/1979 | Cox et al. | | 52/115 |
| 4,221,088 A * | 9/1980 | Patterson | | 52/116 |
| 4,375,241 A * | 3/1983 | Gallon | | 173/151 |
| 4,489,526 A * | 12/1984 | Cummins | | 52/125.6 |
| 4,578,911 A * | 4/1986 | Hashimoto | | 52/120 |
| 4,598,509 A * | 7/1986 | Woolslayer et al. | | 52/118 |
| 4,616,454 A * | 10/1986 | Ballachey et al. | | 52/115 |
| 4,759,414 A * | 7/1988 | Willis | | 175/170 |
| 4,831,795 A * | 5/1989 | Sorokan | | 52/120 |
| 5,450,695 A | 9/1995 | Desai | | |
| 6,523,319 B2 * | 2/2003 | Bockhorn et al. | | 52/651.01 |
| 6,594,960 B2 * | 7/2003 | Brittain et al. | | 52/117 |
| 6,634,436 B1 * | 10/2003 | Desai | | 173/1 |
| 6,848,515 B2 * | 2/2005 | Orr et al. | | 173/1 |
| 6,994,171 B2 * | 2/2006 | Orr et al. | | 173/28 |
| 7,306,055 B2 * | 12/2007 | Barnes | | 175/57 |
| 7,308,953 B2 * | 12/2007 | Barnes | | 175/203 |
| 7,413,393 B1 * | 8/2008 | Barnes | | 414/373 |
| 7,765,749 B2 * | 8/2010 | Palidis | | 52/112 |
| 7,828,087 B2 * | 11/2010 | Vora | | 175/220 |
| 7,931,076 B2 * | 4/2011 | Ditta et al. | | 166/75.11 |
| 8,468,753 B2 * | 6/2013 | Donnally et al. | | 52/117 |
| 8,572,926 B2 | 11/2013 | Vangsy et al. | | |
| 2003/0051915 A1 * | 3/2003 | Brittain et al. | | 175/52 |
| 2003/0172599 A1 * | 9/2003 | Frink | | 52/116 |
| 2004/0211598 A1 * | 10/2004 | Palidis | | 175/162 |
| 2005/0194189 A1 * | 9/2005 | Barnes | | 175/122 |
| 2009/0000218 A1 * | 1/2009 | Lee et al. | | 52/123.1 |
| 2009/0218144 A1 * | 9/2009 | Donnally et al. | | 175/162 |
| 2009/0321135 A1 * | 12/2009 | Vora | | 175/57 |

\* cited by examiner

PORTABLE DRILLING RIG APPARATUS AND ASSEMBLY METHOD

CROSS-REFERENCE TO RELATED APPLICATIONS

The present application is a divisional application of and, thereby, claims benefit under 35 U.S.C. §120 to U.S. patent application Ser. No. 12/568,489 filed on Sep. 28, 2009, titled, "PORTABLE DRILLING RIG APPARATUS AND ASSEMBLY METHOD." The contents of the priority application are incorporated by reference in its entirety.

BACKGROUND

1. Field of the Disclosure

Embodiments disclosed herein relate generally to drilling rigs. In particular, embodiments disclosed herein relate to portable drilling rig apparatuses and related methods of assembly.

2. Background Art

A drilling rig is used to drill a wellbore in a formation. Drilling rigs may be large structures that house equipment used to drill water wells, oil wells, or natural gas extraction wells. Drilling rigs sample sub-surface mineral deposits, test rock, soil and groundwater physical properties, and may also be used to install sub-surface fabrications, such as underground utilities, instrumentation, tunnels or wells. Drilling rigs may be mobile equipment mounted on trucks, tracks, or trailers, or more permanent land or marine-based structures (such as oil platforms). The term "rig," therefore, generally refers to a complex of equipment that is used to penetrate the surface of the earth's crust.

Referring to FIG. 1, a conventional drilling rig 30 is shown. Drilling rig 30 includes a derrick 14, which provides a support structure for a majority of the equipment used to raise and lower a drillstring 25 into and out of a wellbore. The drillstring 25 may be an assembled collection of drillpipe, drill collars, or any other assortment of tools, connected together and run into the wellbore to facilitate the drilling of a well (drillpipe 16 is shown in joints prior to being connected together). The drillstring 25 may be raised and lower into and out of the wellbore by the draw-works 7, which includes a spool powered by a motor or other power source 5. A drill line 12, which may be a thick, stranded metal cable, is run from the draw-works 7 over a crown block 13 and down through a travelling block 11. Typically, the crown block 13 remains stationary while the travelling block 11 moves vertically with the drillstring 25. The combination of the crown block 13 and the travelling block 11 provides a significant mechanical advantage for lifting the drillstring 25. Further, a swivel 18 may be attached to the travelling block 11 to allow rotation of the drillstring 25 without twisting the travelling block 11.

The drilling rig 30 further includes a rotary table 20 mounted in a rig floor 21, which is used to rotate the drillstring 25 along with a kelly drive 19. Kelly drive 19, attached at an upper end to the swivel 18 and at a lower end to the drillstring 25, is inserted through the rotary table 20 to rotate the drillstring 25 (drillstring rotation shown by arrow "R"). Kelly drive 19 may be square, hexagonal, or any other polygonal-shaped tubing and is able to move freely vertically while the rotary table 20 rotates it. Alternatively, drilling rig 30 may include a top drive (not shown) in place of kelly drive 19 and rotary table 20. Additionally, blowout preventers ("BOPs") may be located below the rig floor 21 and installed atop a wellhead 27 to prevent fluids and gases from escaping from the wellbore. An annular BOP 23 and one or more ram BOPs 24 are shown and are commonly understood in the art.

During drilling operations, drilling fluid may be circulated through the system to carry cuttings away from the bottom of the wellbore as drilling progresses. Drilling fluid may be stored in mud tanks 1 before being drawn through suction line 3 by mud pumps 4. Drilling fluid (drilling fluid route is indicated by arrows "F") is then pumped from mud pumps 4 through a hose 6, up a stand pipe 8, through a flexible hose 9, and down into the wellbore. Drilling fluid returning from the wellbore is routed through a flow line 28 to shakers 2, which are used to separate drill cuttings from the drilling fluid before it is pumped back down the wellbore.

Drilling rigs may add considerable cost to the overall costs of extracting oil or natural gas from underground reservoirs. This may be due to large equipment needed to erect certain drilling rigs or the difficulty of erecting certain drilling rigs in remote locations where it may be more costly to transport the drilling rig. Also, certain oil and natural gas wells may have a relatively limited well life, i.e., the well has only a limited amount of gas or oil capable of being extracted. Because of the reduced production, to maintain profitable margins from drilling and producing such a well, a less expensive drilling rig would be desirable. Thus, there exists a need for an economical drilling rig capable of being transported to remote and difficult to reach locations.

SUMMARY OF THE DISCLOSURE

In one aspect, embodiments disclosed herein relate to a portable drilling rig apparatus including a rig floor having a pedestal structure thereon, the pedestal structure comprising a lower pivot point and a lower attachment point and wherein the pedestal structure is configured to be rotated to a vertical position about the lower pivot point. The drilling rig further includes a mast structure having a mast pivot point at a lower end of the mast structure wherein the mast pivot point is configured to be pinned to an upper pivot point of the pedestal structure.

In other aspects, embodiments disclosed herein relate to a method to assemble a portable drilling rig, the method including providing a pedestal structure on a rig floor, the pedestal structure comprising a lower pivot point, a lower attachment point, and an upper pivot point. The method further includes aligning a mast structure and the pedestal structure, pinning a mast pivot point located at a lower end of the mast structure to the upper pivot point of the pedestal structure, and pivoting the pedestal structure from a substantially horizontal position to a vertical position. Further, the method includes moving the mast structure in a horizontal direction toward a center of the rig floor, securing the lower attachment point of the pedestal structure to a corresponding attachment point on the rig floor, erecting the mast structure from a substantially horizontal position to a vertical position about a pivot point between the mast structure and the pedestal structure, and securing the mast structure in a vertical position.

In other aspects, embodiments disclosed herein relate to a method to assemble a portable drilling rig, the method including attaching a mast structure to a pedestal structure on a rig floor and pivoting the pedestal structure from a horizontal position to a vertical position about a lower pivot point and securing the pedestal structure to the rig floor.

In other aspects, embodiments disclosed herein relate to an apparatus to restrict axial movement between an inner mast section and an outer mast section, the apparatus including a latch mechanism pivotably connected to the inner mast section wherein the latch mechanism is configured to move between a collapsed position and an extended position. The apparatus further includes a first cutout formed in an outer surface of the inner mast section wherein the latch mechanism sits flush with the outer surface of the inner mast section when the latch mechanism is in the collapsed position, and a second cutout formed in an inner surface of the outer mast section, wherein the latch mechanism is configured to be extended radially and engage the second cutout in the inner surface of the outer mast section.

Other aspects and advantages of the invention will be apparent from the following description and the appended claims.

DETAILED DESCRIPTION

In one aspect, embodiments disclosed herein relate to portable drilling rig apparatuses and related methods of assembling the portable drilling rig.

Figure 2:
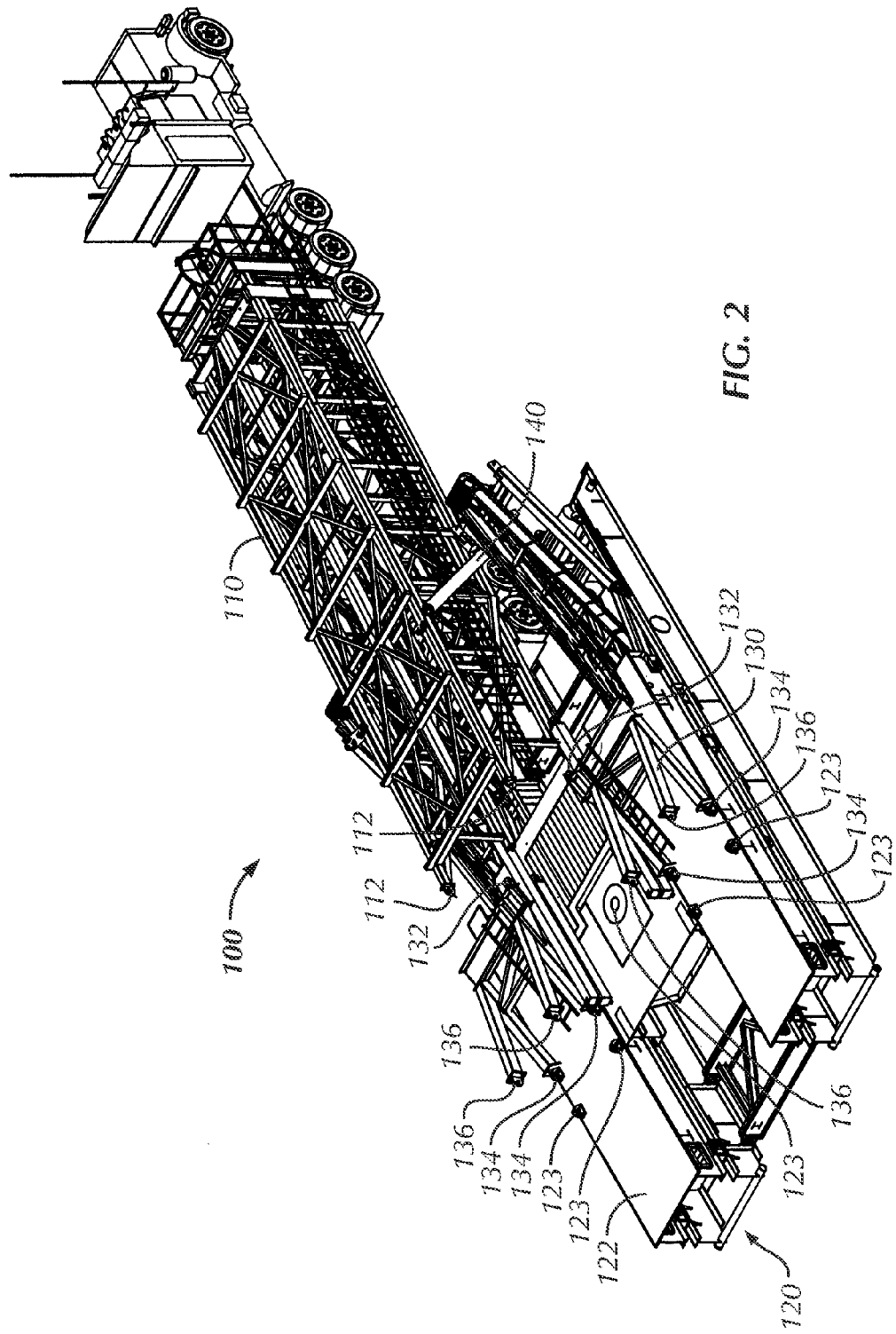
FIG. 2 is a perspective view of a portable drilling rig prior to assembly in accordance with embodiments of the present disclosure.

Referring to FIG. 2, a perspective view of a portable drilling rig 100 prior to assembly is shown in accordance with embodiments of the present disclosure. The drilling rig 100 includes a base assembly 120 and a mast structure 110 configured to be installed on the base assembly 120. The base assembly 120 includes a collapsible rig floor 122, which will be described later.

Drilling rig 100 may further include a pedestal structure 130 that may be mounted on rig floor 122 and configured to link mast structure 110 and rig floor 122, as well as aid with assembly of the drilling rig 100. Pedestal structure 130 may include an upper attachment point 132 configured to be pinned to a mast pivot point 112 during assembly. Pedestal structure 130 may also include a lower pivot point 134, which is pinned to rig floor 122, about which pedestal structure 130 may pivot and a lower attachment point 136 where pedestal structure is pinned to rig floor 112 after being positioned in a vertical position, as explained later. Initially, as shown in FIG. 2, pedestal structure 130 may be laid over in a substantially horizontal position, in which lower attachment point 136 is unpinned, thereby allowing pedestal structure 130 to freely pivot about lower pivot point 134.

Figure 3:
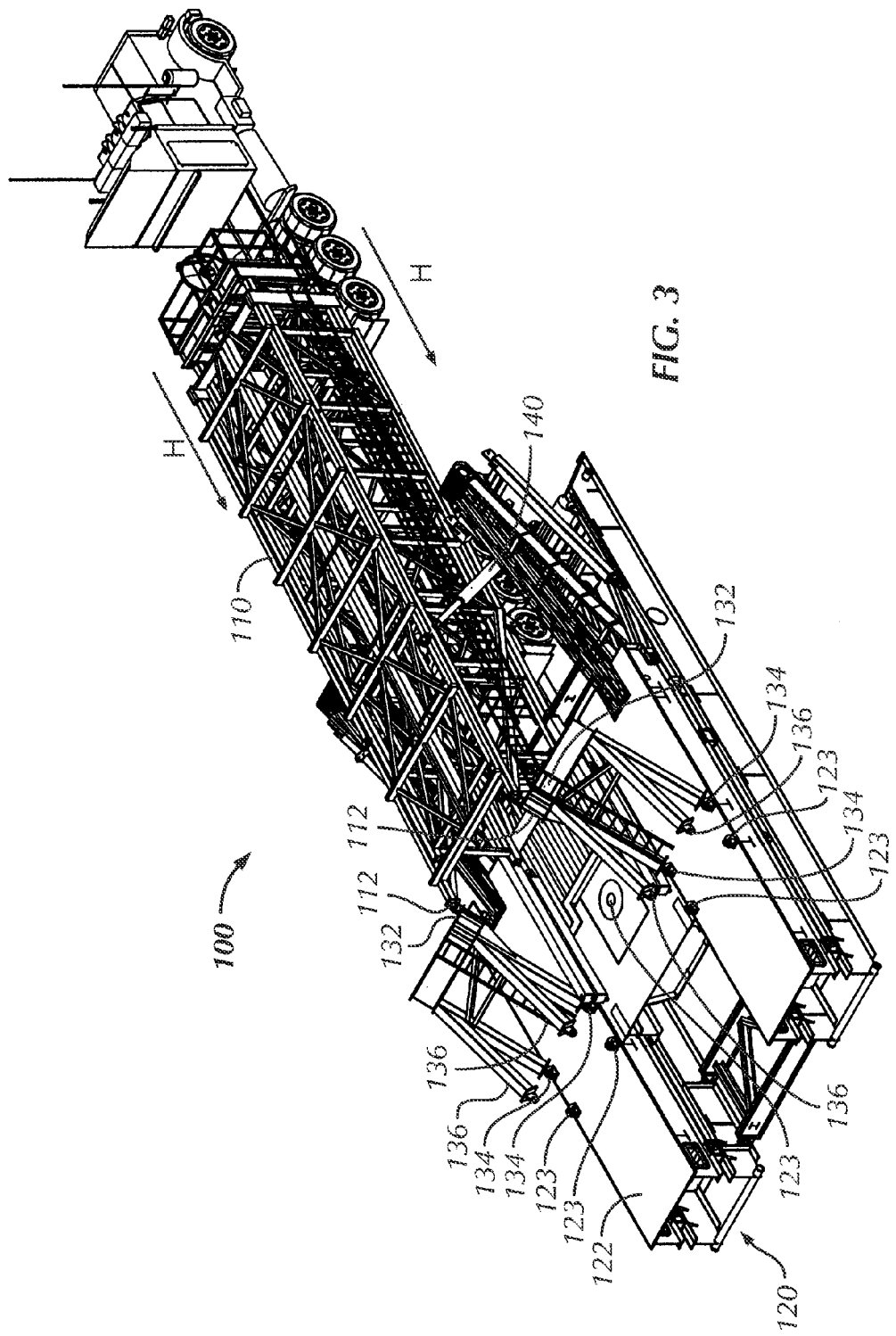
FIG. 3 is a perspective view of the portable drilling rig at a first intermediate assembly stage in accordance with embodiments of the present disclosure.

Referring now to FIG. 3, a perspective view of portable drilling rig 100 at a first intermediate assembly stage is shown in accordance with embodiments of the present disclosure. To begin assembly, mast pivot point 112 of mast structure is aligned with upper pivot points 132 of pedestal structure and pinned together. Hydraulic cylinders 140, attached to mast structure 110 and a first attachment point 142 on base assembly 120, may be used to properly align mast pivot point 112 and upper pivot point 132 prior to pinning them together. Once mast pivot point 112 and upper pivot point 132 are pinned together, mast structure 110 is moved horizontally in direction "H" toward a center 123 of rig floor 112. Again, hydraulic cylinders 140 may be used to move mast structure 110 horizontally. Because mast structure 110 is pinned at mast pivot point 112 to upper pivot point 132 of pedestal structure, movement of mast structure 110 in direction H may pivot pedestal structure upward about lower pivot point 134.

Figure 4:
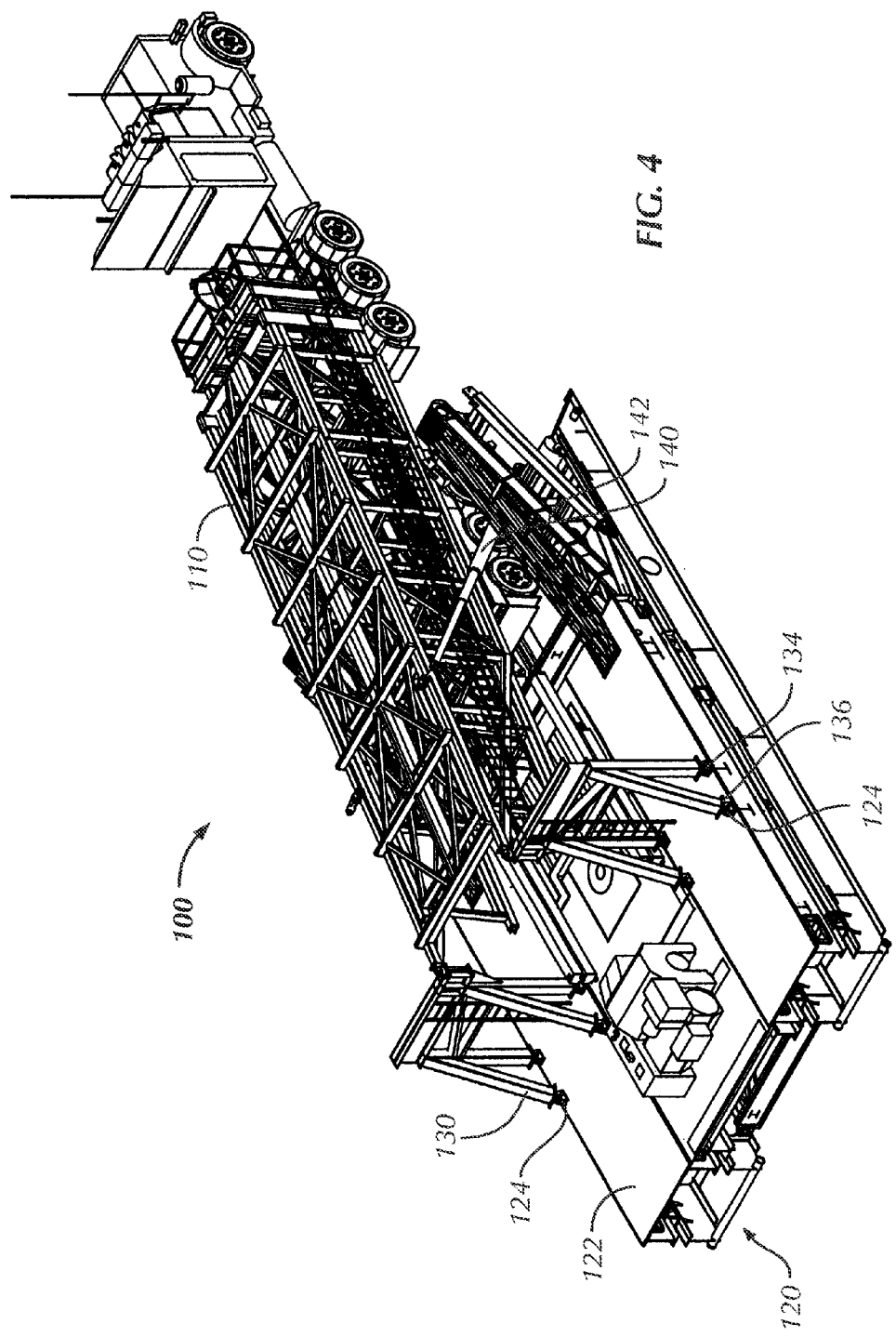
FIG. 4 is a perspective view of the portable drilling rig at a second intermediate assembly stage in accordance with embodiments of the present disclosure.

Now referring to FIG. 4, a perspective view of portable drilling rig 100 at a second intermediate assembly stage is shown in accordance with embodiments of the present disclosure. Hydraulic cylinders 140 continue to move mast structure 110 horizontally, and pedestal structure 130 continues to rotate about lower pivot point 134 until lower attachment points 136 of pedestal structure 130 are aligned with corresponding rig floor attachment points 124 of rig floor 122. Once aligned, lower attachment points 136 and rig floor attachment points 124 may be pinned, thereby securing pedestal structure 130 to rig floor 112 and preventing pedestal structure 130 from pivoting about lower pivot points 134 any further.

Figure 5:
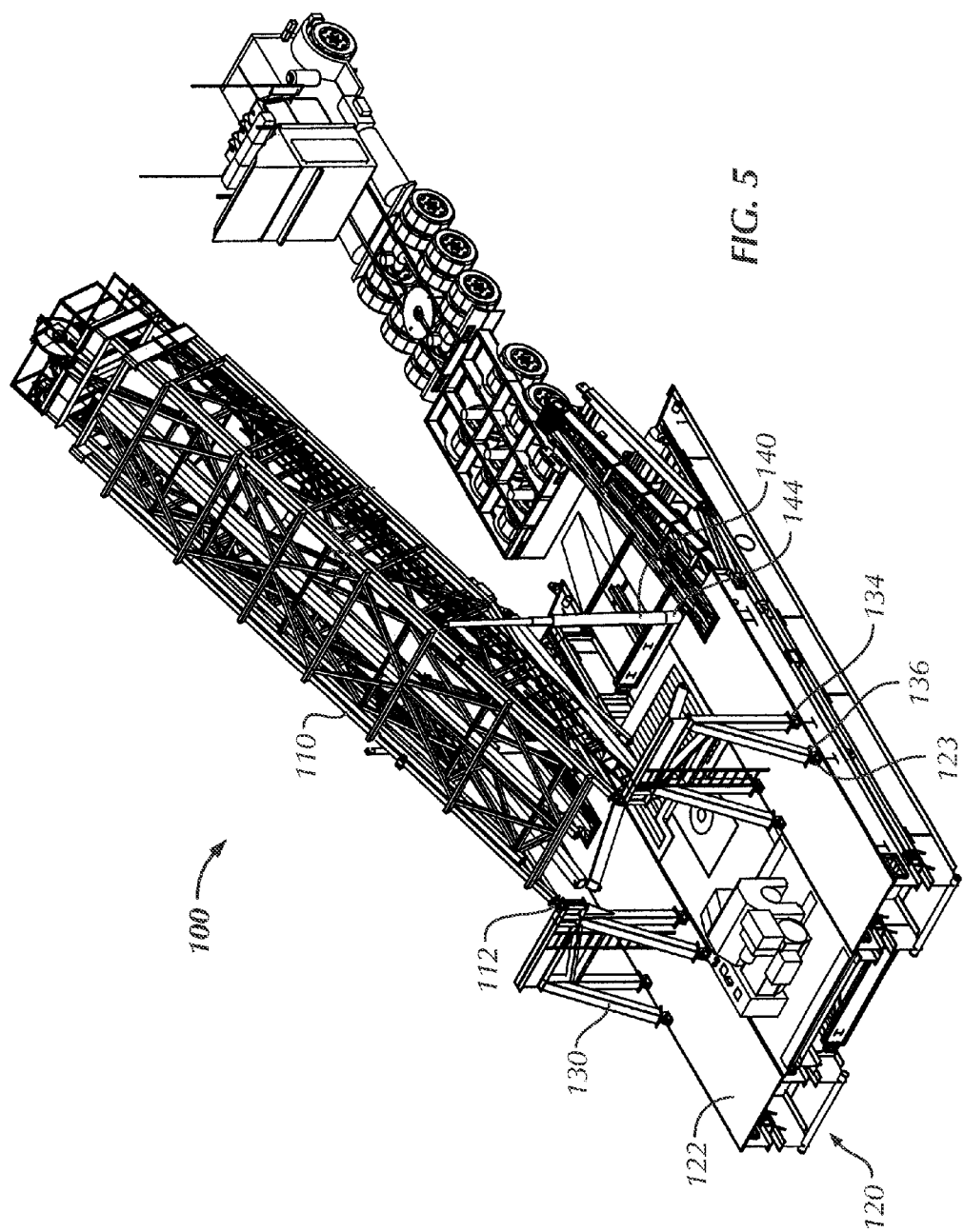
FIGS. 5-6 are perspective views of the portable drilling rig at third and fourth intermediate assembly stages in accordance with embodiments of the present disclosure.
Figure 6:
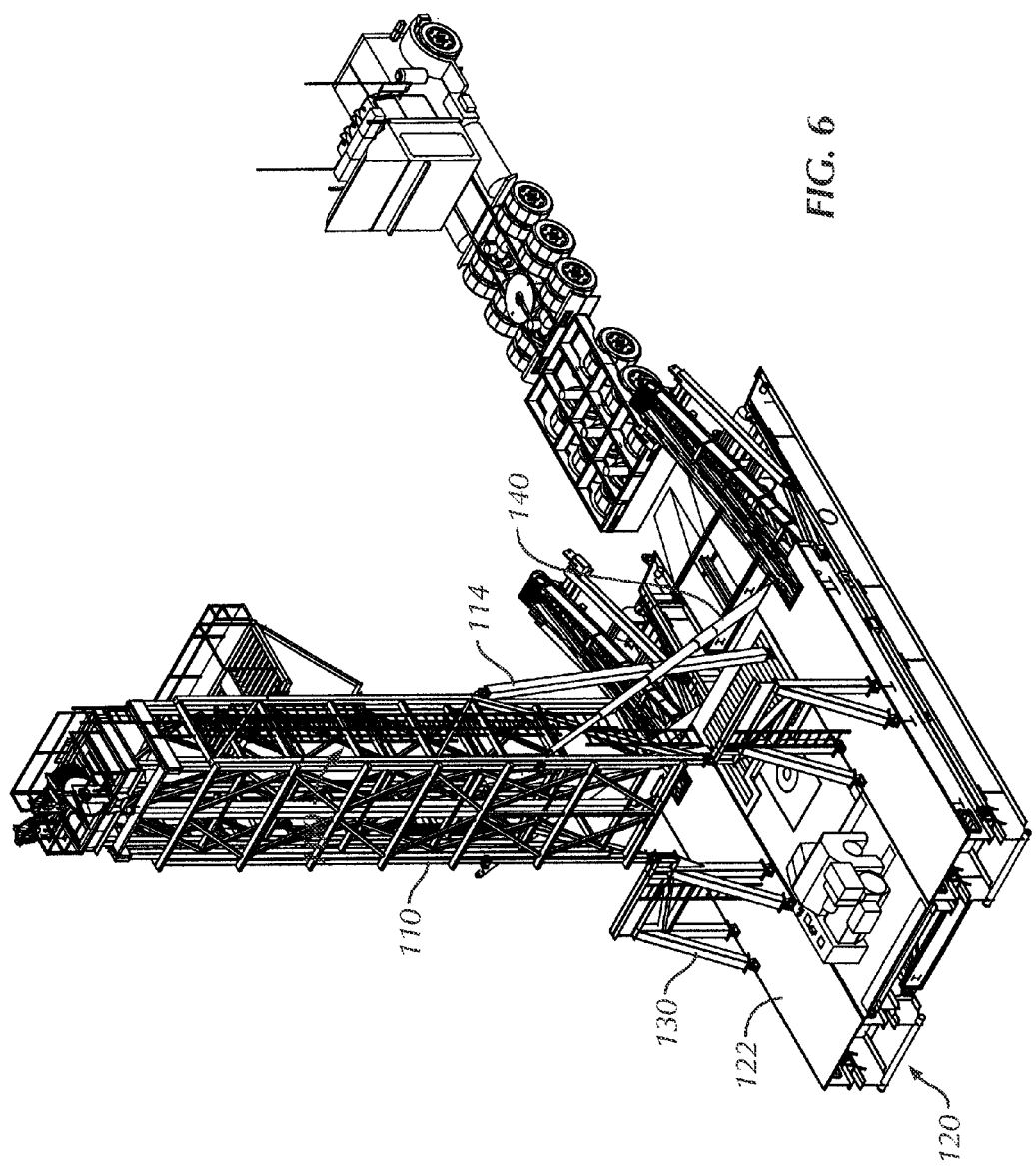

Referring now to FIGS. 5 and 6, perspective views of portable drilling rig 100 at third and fourth intermediate assembly stages are shown in accordance with embodiments of the present disclosure. Hydraulic cylinders 140 previously used to move mast structure 110 horizontally may be moved from first attachment point 142 (FIG. 4) and reattached to a second attachment point 144, which provides the hydraulic cylinders 140 with a new range of motion used to erect mast structure 110. As shown, hydraulic cylinders 140 may be extended to erect mast structure 110 as mast structure 110 pivots about the attachment between upper pivot point 132 and mast pivot point 112.

FIG. 6 illustrates mast structure 110 after it has been raised to a final vertical position. As shown, hydraulic cylinders 140 may be fully extended to erect mast structure 110. To secure mast structure to rig floor 122, a mast leg 114, which connects to a point on mast structure 110 and rig floor 112, may be fully extended and fastened. Once installed, hydraulic cylinders 140 may be retracted, as they are no longer needed.

Figure 1:
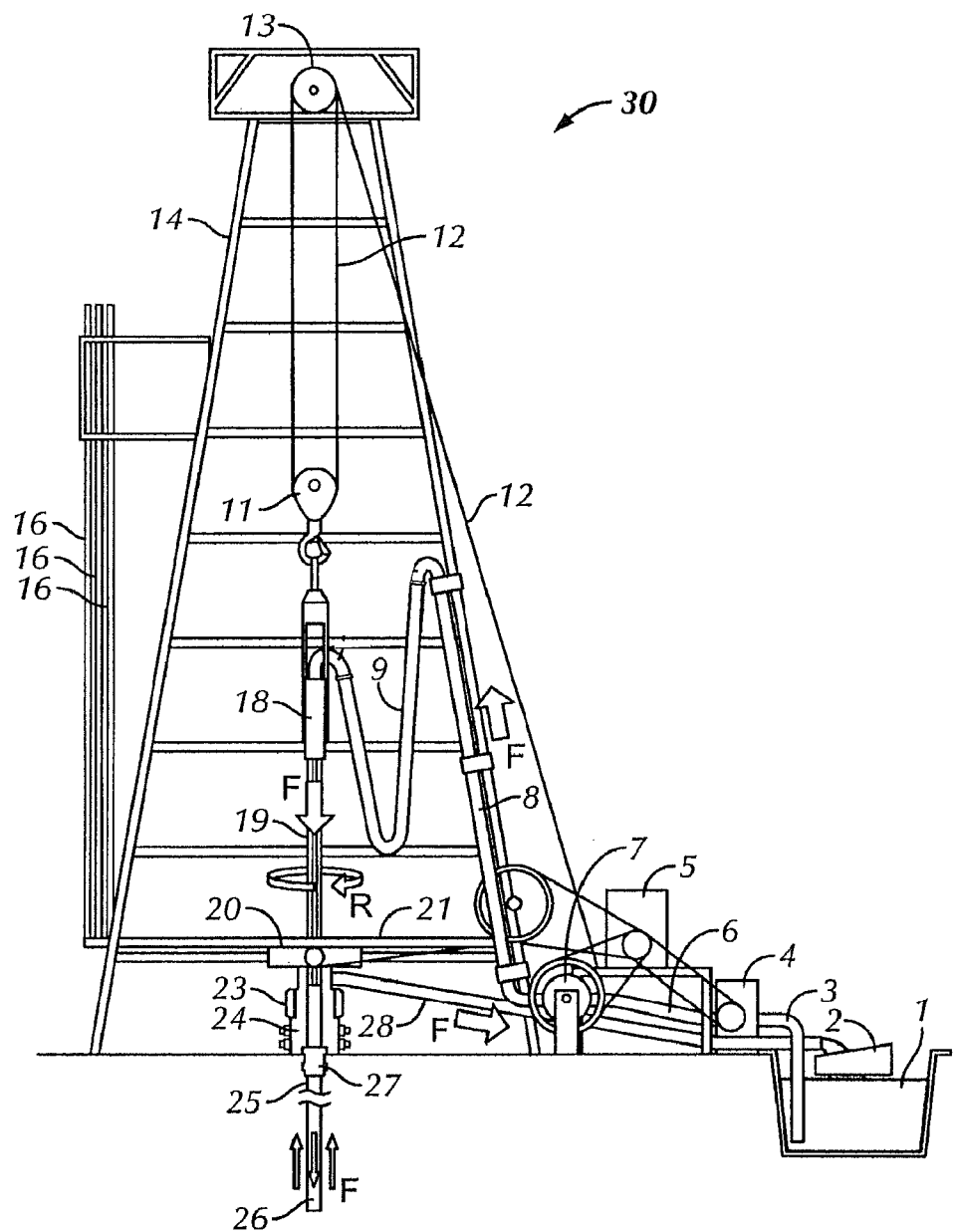
FIG. 1 is a cross-sectional schematic view of a conventional drilling rig.
Figure 7:
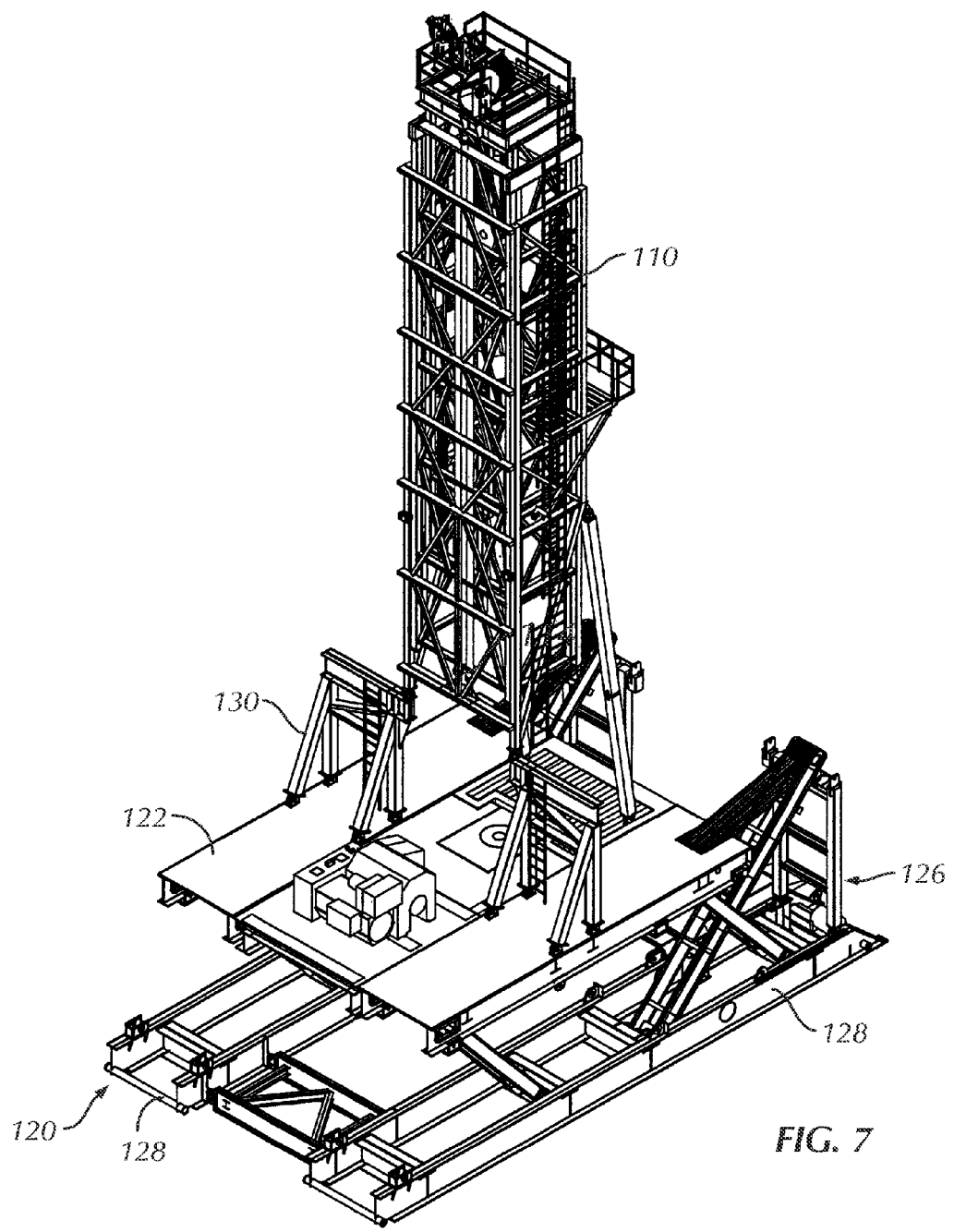
FIGS. 7-8 are perspective views of the portable drilling rig at fifth and sixth intermediate assembly stages in accordance with embodiments of the present disclosure.
Figure 8:
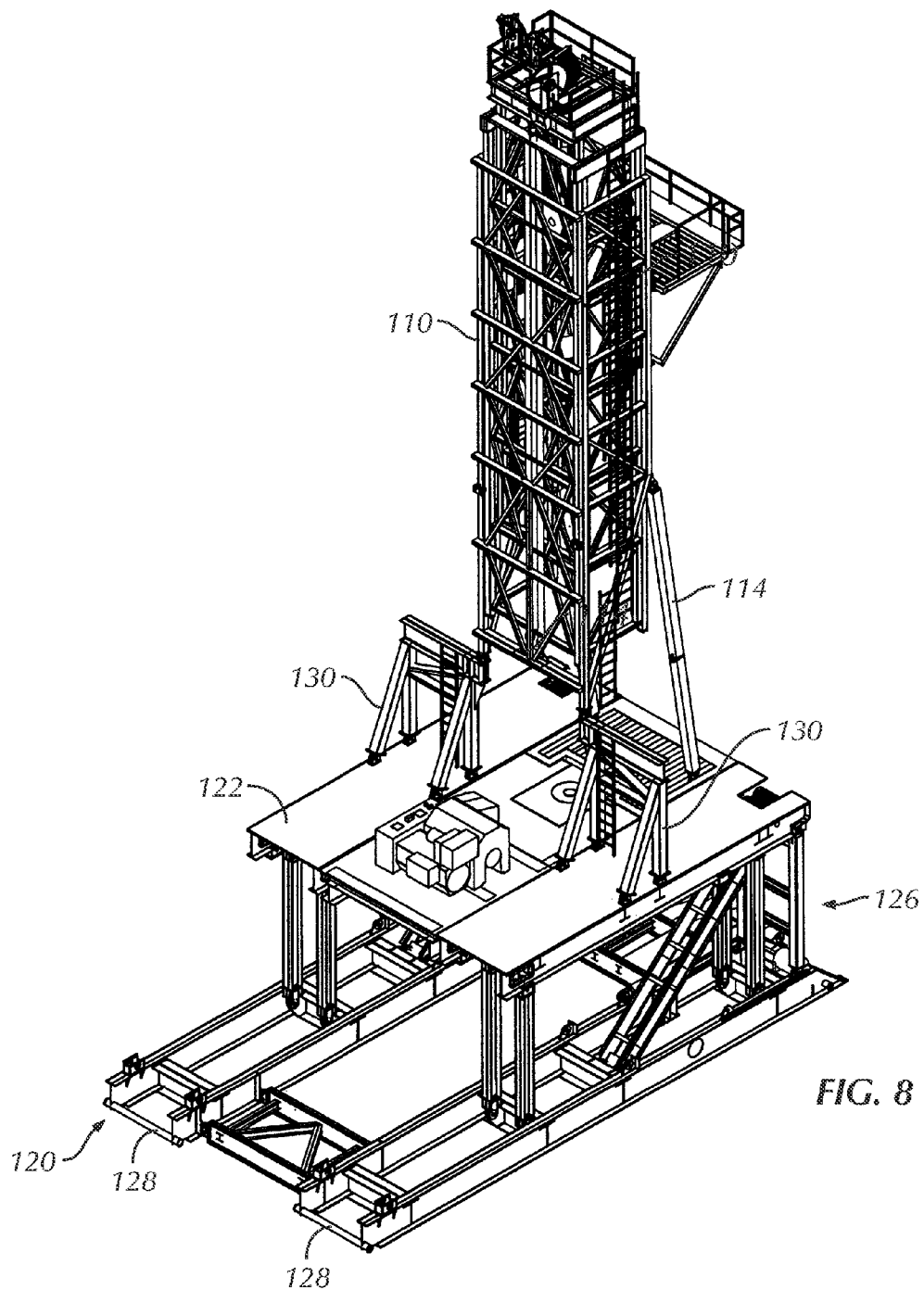

Referring now to FIGS. 7 and 8, perspective views of portable drilling rig 100 at fifth and sixth intermediate assembly stages are shown in accordance with embodiments of the present disclosure. After mast structure 110 is fully erected and secured, rig floor 122 may be elevated to a specified height. As previously described, this specified height is often driven by requirements for the height of a crown block (13 in FIG. 1) or blowout prevention equipment (23, 24 in FIG. 1) installed below rig floor 122, which will be understood by those skilled in the art. In certain embodiments, a hydraulic system 126, mounted at a lower end to skids 128 and an upper end to rig floor 112, may be used to elevate rig floor 122. Those skilled in the art will understand that pneumatic and mechanical systems may also be used.

Figure 9:
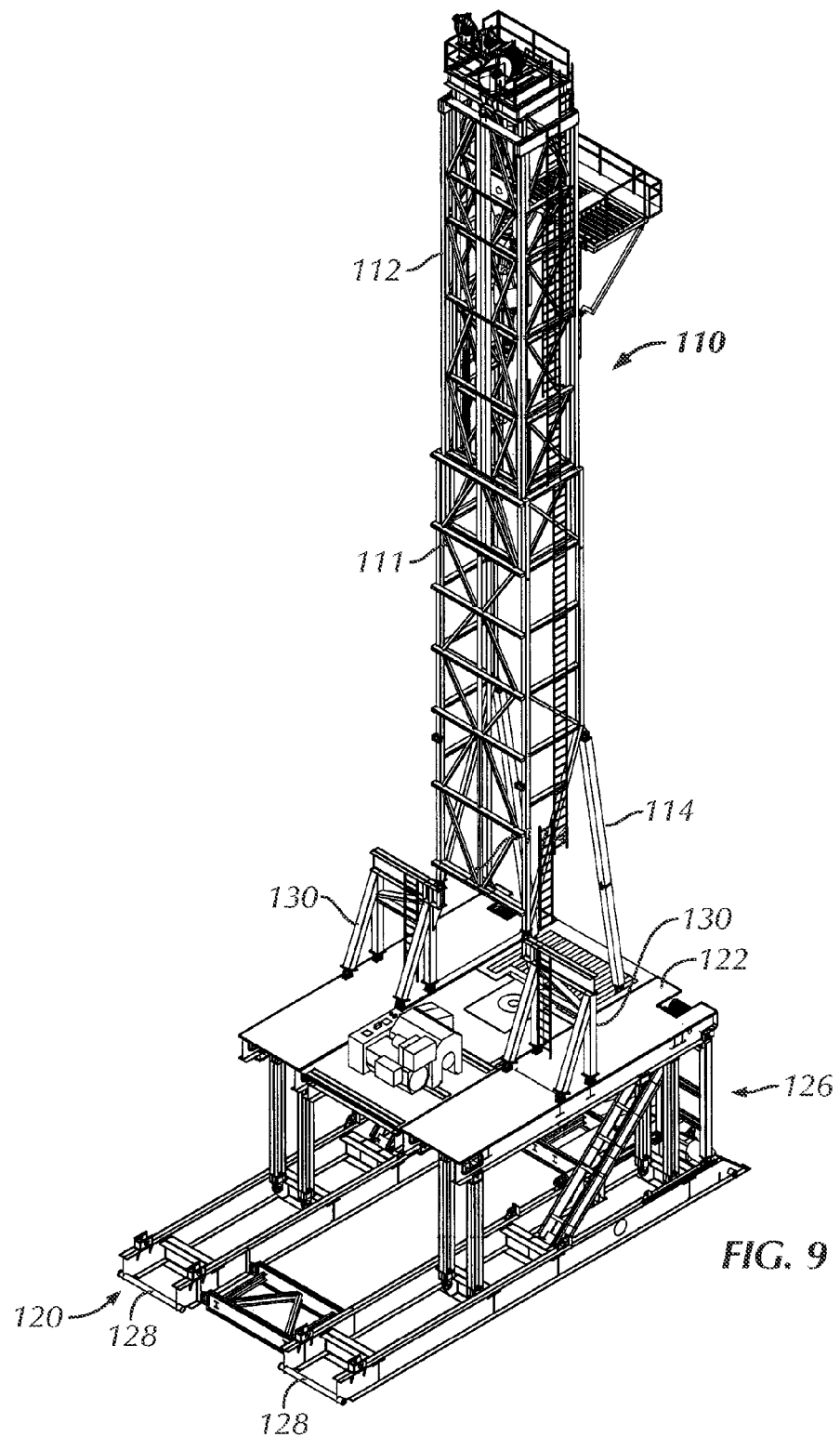
FIG. 9-10 are perspective views of the portable drilling rig at seventh or eighth intermediate assembly stages in accordance with embodiments of the present disclosure.
Figure 10:
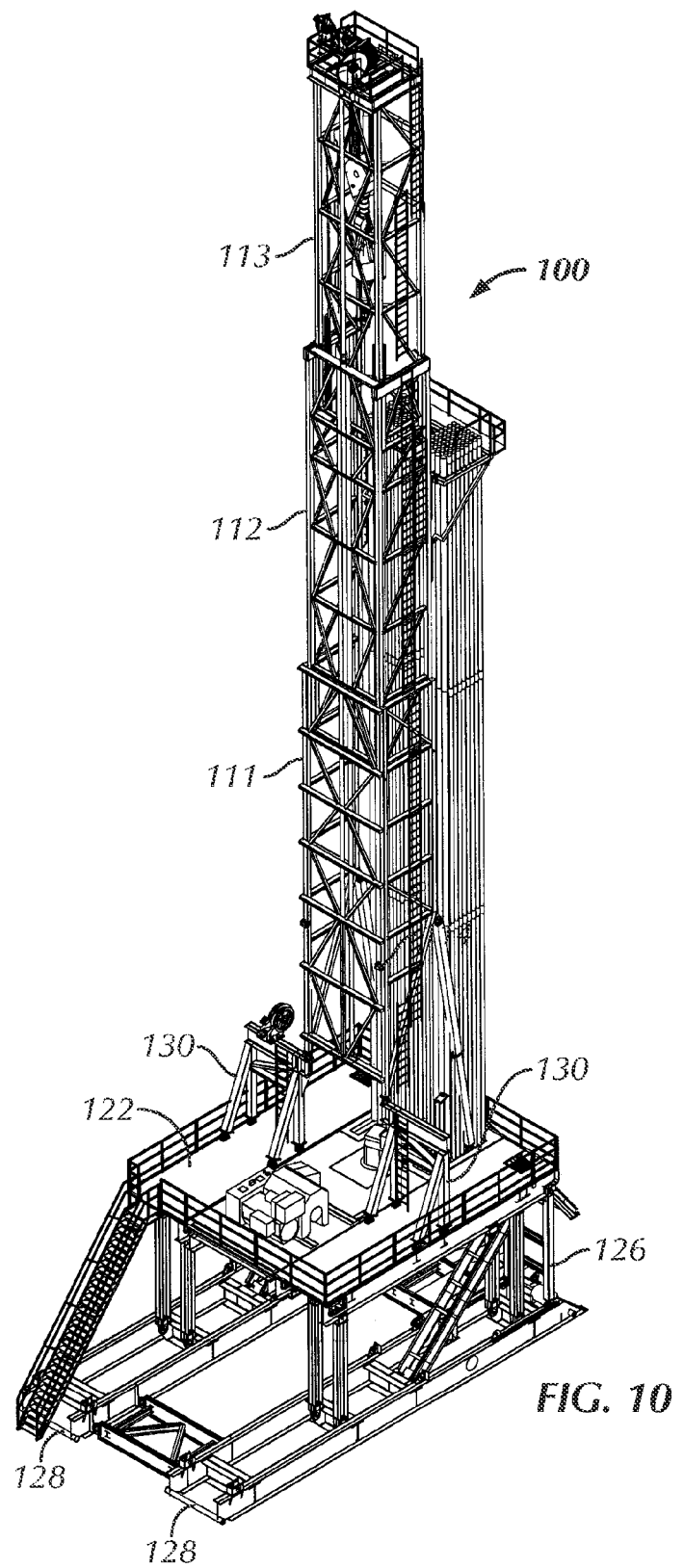

FIGS. 9 and 10 are perspective views of portable drilling rig 100 during seventh and eighth intermediate assembly stages in accordance with embodiments of the present disclosure, at which point mast structure 110 is extended to a final (drilling) height. As shown, mast structure 110 may be configured as a telescoping structure including multiple mast sections 111, 112, and 113, with each mast section having a slightly smaller cross-sectional area than the mast section below it. In this way, multiple mast sections are able to fit within the mast section below it, thus allowing the mast structure 110 to be collapsed to a shorter length for easier transportation and handling during assembly. The mast sections may be raised using hydraulics, pneumatics, mechanical devices, or other methods known to those skilled in the art.

Figure 11:
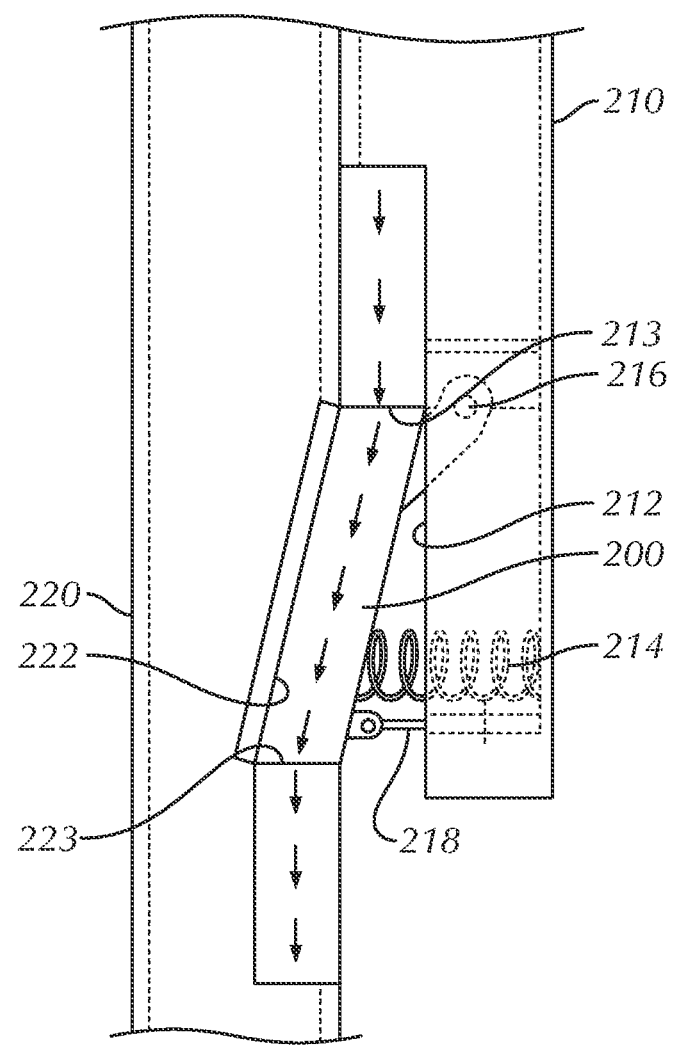
FIG. 11 is a cross-sectional view of a latch to secure telescoping mast sections of the portable drilling rig in accordance with embodiments of the present disclosure.

Referring now to FIG. 11, a cross-sectional view of a latch 200 used to lock and restrict movement between the extended mast sections of mast structure is shown in accordance with embodiments of the present disclosure. Latch 200 may be installed on a smaller inner mast section 210, or a mast section that fits inside a slightly larger outer mast section 220. Inner mast section 210 has a cavity or cutout 212 formed in an outer surface of inner mast section 210 in which latch 200 may be positioned to sit flush with an outer profile of inner mast section 210 (so that inner mast section 210 is free to slide up and down within outer mast section 220 when latch 200 is collapsed). Similarly, outer mast section 220 has a corresponding cutout 222 formed in an inner surface of outer mast section 220, into which latch 200 may extend to secure the two mast sections relative to each other. Latch 200 is attached to inner mast section 210 at an attachment point 216 about which latch 200 is able to pivot and move from a collapsed position to an extended position (shown). Further, a spring 214 may be provided to bias latch 200 into an extended position and a cable 218 (or other device) may be provided to operate latch 200.

As such, when mast sections are extended (e.g., as shown in FIGS. 9 and 10), latch 200 may be aligned with cavity 222 formed in an inner surface of outer mast section 220, at which point latch 200 may be extended radially outward to engage cavity 222. When engaged, latch 200 contacts a ledge 213 of inner section 210 and ledge 223 of outer section 220, so that load forces (represented by "F") may be transmitted from inner section 210, through latch 200, and into outer section 220.

Advantageously, embodiments of the present disclosure for a highly mobile and economical drilling rig capable of reaching remote well locations. The unique pedestal structure eliminates a need for large cranes or other lifting equipment typically required to erect a mast structure, making the drilling rig easily portable to various locations. Additionally, because less equipment is required for assembly, initial assembly costs for setting up the drilling rig may be reduced, which in turn may increase profit margins from smaller or limited production wells.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A method to assemble a portable drilling rig, the method comprising:
   providing a pedestal structure on a rig floor;
   the pedestal structure comprising a lower pivot point, a lower attachment point, and an upper pivot point;
   aligning a mast structure and the pedestal structure;
   pinning a mast pivot point located at a lower end of the mast structure to the upper pivot point of the pedestal structure;
   pivoting the pedestal structure from a substantially horizontal position to a vertical position;
   moving the mast structure in a horizontal direction toward a center of the rig floor;
   securing the lower attachment point of the pedestal structure to a corresponding attachment point on the rig floor;
   erecting the mast structure from a substantially horizontal position to a vertical position about a pivot point between the mast structure and the pedestal structure; and
   securing the mast structure in a vertical position.

2. The method of claim 1, further comprising elevating the rig floor to a specified height.

3. The method of claim 1, further comprising extending a mast leg from the mast structure to the rig floor to secure the mast structure in a vertical position.

4. The method of claim 1, wherein erecting the mast structure comprises extending at least one hydraulic cylinder attached to the mast structure and the rig floor.

5. The method of claim 4, further comprising extending multiple telescoping mast sections of the mast structure to a final height.

6. The method of claim 5, further comprising latching the multiple telescoping mast sections to prevent relative movement.

7. A method to assemble a portable drilling rig, the method comprising:
   pinning a mast pivot point located at a lower end of a mast structure to an upper pivot point of a pedestal structure, the mast structure being separable from the pedestal structure, and each of the mast structure and pedestal structure are disposed on a rig floor;
   pivoting the pedestal structure from a horizontal position to a vertical position about a lower pivot point and securing the pedestal structure to the rig floor;
   erecting the mast structure to a vertical position about the upper pivot point of the pedestal structure; and
   extending a mast leg from the mast structure to the rig floor and securing the mast structure in the vertical position.

8. A method of erecting a drilling rig, the method comprising:
   pivoting a pedestal structure about a lower pivot point to a substantially vertical position while an upper pivot point is pinned to a mast pivot point of a mast structure and the mast structure and pedestal structure are disposed on a rig floor, the mast structure being separable from the pedestal structure;
   fastening the pedestal structure to an attachment point on the rig floor;
   erecting the mast structure above the pedestal structure; and
   extending a mast kg from the mast structure to the rig floor and securing the mast structure in a vertical position.

9. The method of claim 8, further comprising latching multiple telescoping mast sections of the mast structure.

10. The method of claim 8, further comprising extending at least one hydraulic cylinder to pivot the pedestal structure.

* * * * *